UNITED STATES PATENT OFFICE.

ERNST KÖNIG, OF HÖCHST-ON-THE-MAIN, GERMANY, ASSIGNOR TO FARBWERKE VORM. MEISTER, LUCIUS & BRÜNING, OF HÖCHST-ON-THE-MAIN, GERMANY, A CORPORATION OF GERMANY.

CYANIN DYE AND PROCESS OF MAKING SAME.

No. 805,143.  Specification of Letters Patent.  Patented Nov. 21, 1905.

Application filed February 16, 1904. Serial No. 193,907. (Specimens.)

*To all whom it may concern:*

Be it known that I, ERNST KÖNIG, Ph. D., chemist, a citizen of the Empire of Germany, residing at Höchst-on-the-Main, Germany, have invented certain new and useful Improvements in the Manufacture of new Cyanin Dyestuffs, of which the following is a specification.

By "cyanin" is meant the known dyestuffs obtained by heating a mixture of quinolin and lepidin-alkyl-iodid with caustic alkali. The magenta-red dyestuff obtained from quinaldin and quinolin-alkyl-iodid has also been called "cyanin."

The cyanins render photographic plates sensitive to the yellow and red light, and in the case of the blue lepidin-cyanins the sensitizing action extends even beyond the line C in the red of the spectrum, whereas the red-violet quinaldincyanins sensitize only up to D ½ C in the orange.

The object of the present invention is to produce quinaldincyanins which will render the photographic plate more sensitive to red than do those known. For this purpose a mixture of an alkyl halide of quinolin or of quinolin substituted in the meta or para position (which, according to another nomenclature, is the 5 or 6 position) by alkyl or alkyloxyl and an alkyl halide of quinaldin similarly substituted or a mixture of an alkyl halide of quinolin substituted in the meta or para position by alkyl or alkyloxyl and an alkyl halide of quinaldin is heated with alkali in a suitable solvent, such as alcohol.

The following dyestuffs have been made according to this invention: quinaldin-meta-toluquinolinalkylcyanin, quinaldin-para-toluquinolinalkylcyanin, quinaldin-para-methoxy-quinolinalkylcyanin, meta-toluquinaldin-quinolinalkylcyanin, meta-toluquinaldin-meta-toluquinolinalkylcyanin, meta-toluquinaldin-para-toluquinolinalkylcyanin, para-toluquinaldin-quinolinalkylcyanin, para-toluquinaldin-meta-toluquinolinalkylcyanin, para-toluquinaldin-para-toluquinolinalkylcyanin, para-toluquinaldin-para-methoxyquinolinalkylcyanin, para-methoxyquinaldin-para-methoxyquinolincyanin, para-ethoxyquinaldin-para-ethoxyquinolincyanin. Of these new dyestuffs are specially distinguished para-toluquinaldin-quinolinalkylcyanin, para-toluquinaldin-para-toluquinolinalkylcyanin, para-toluquinaldin-para-methoxy-quinolinalkylcyanin, para-methoxyquinaldin-para-methoxyquinolincyanin, and para-ethoxy-quinaldin-para-ethoxyquinolincyanin by their rendering the photographic plate about twice to four times as sensitive to red as the hitherto known quinaldinquinolincyanin.

Example I: Thirty grams of para-toluquinaldin-methyliodid

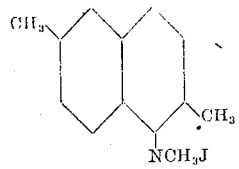

and fifty-eight grams of para-toluquinolin-methyliodid are dissolved in eight hundred cubic centimeters of alcohol and the boiling solution is treated with 5.6 grams of caustic potash. The dyestuff is formed within a few minutes, and generally separates from the deep-red solution on cooling; but it may be necessary to add ether to precipitate the dyestuff, which is purified by recrystallization from water or alcohol. The pure dyestuff forms dark-green brilliant needles, soluble with some difficulty in hot absolute alcohol, more readily soluble in hot water to a violet solution.

Example II: Thirty grams of meta-toluquinaldin-ethyl-iodid and sixty grams of meta-toluquinolin-ethyliodid are dissolved in alcohol and the boiling solution is treated with 5.6 grams of caustic potash. The dyestuff thus formed crystallizes when the solution is cold, and when purified forms beautiful crystals of coppery luster, soluble with some difficulty in hot absolute alcohol, but more readily soluble in hot dilute alcohol to a red-violet solution.

It will be understood that the invention is not limited to the manufacture of the compounds named, for by the use of other derivatives of para and meta substituted quinolins and quinaldins or their derivatives or mixtures thereof like dyestuffs are obtainable.

Having now described my invention, what I claim is—

1. The process herein described of making new cyanin dyestuffs, which consists in heating with alkalies in a suitable solvent a mixture of two quinolinium salts of which one contains a methyl in alpha position in the pyridin nucleus and one an alkyl linked to the benzene nucleus in the so-called 5 position.

2. As new products, the new cyanin dyestuffs obtained as herein set forth, being brilliant green to bronze-colored crystals, readily soluble in hot water, alcohol and chloroform with a red-violet color, less soluble in cold water, insoluble in ether, benzene and ligroin; the aqueous solution becoming decolored on adding diluted mineral acid, but reassumes its color on adding alkali; on shaking the aqueous solution with chloroform the latter absorbs the dyestuff so readily and completely as to decolor the aqueous solution.

In testimony that I claim the foregoing as my invention I have signed my name in presence of two subscribing witnesses.

ERNST KÖNIG.

Witnesses:
ALFRED BRISBOIS,
JOSEPH FLACH.